(12) United States Patent
Agarwal et al.

(10) Patent No.: US 8,392,541 B2
(45) Date of Patent: Mar. 5, 2013

(54) DISTRIBUTED CONTROL TECHNIQUE FOR RPL TOPOLOGY

(75) Inventors: Navneet Agarwal, Bangalore (IN);
Jean-Philippe Vasseur, Saint Martin dUriage (FR)

(73) Assignee: Cisco Technology, Inc., San Jose, CA (US)

( * ) Notice: Subject to any disclaimer, the term of this patent is extended or adjusted under 35 U.S.C. 154(b) by 89 days.

(21) Appl. No.: 13/117,276

(22) Filed: May 27, 2011

(65) Prior Publication Data

US 2012/0254338 A1    Oct. 4, 2012

(30) Foreign Application Priority Data

Apr. 1, 2011    (IN) ............................. 936/DEL/2011

(51) Int. Cl.
*G06F 15/16* (2006.01)
(52) U.S. Cl. ........ 709/220; 709/224; 709/228; 370/252; 370/389
(58) Field of Classification Search .................. 709/220, 709/224, 228; 370/252, 389
See application file for complete search history.

(56) References Cited

U.S. PATENT DOCUMENTS

| | | | |
|---|---|---|---|
| 7,403,980 B2 * | 7/2008 | Stringer-Calvert et al. .. | 709/220 |
| 7,656,857 B2 | 2/2010 | Thubert et al. | |
| 7,693,064 B2 | 4/2010 | Thubert et al. | |
| 7,940,758 B2 * | 5/2011 | Baker et al. .................... | 370/389 |
| 2002/0055989 A1 * | 5/2002 | Stringer-Calvert et al. .. | 709/220 |
| 2008/0232358 A1 * | 9/2008 | Baker et al. .................... | 370/389 |
| 2011/0228788 A1 | 9/2011 | Thubert et al. | |
| 2012/0254338 A1 * | 10/2012 | Agarwal et al. ............... | 709/208 |

FOREIGN PATENT DOCUMENTS

IN    936/DEL/2011    4/2011

OTHER PUBLICATIONS

U.S. Appl. No. 12/951,198 entitled Method and Apparatus to Reduce Cumulative Effect of Dynamic Metric Advertisement in Smart Grid/Sensor Networks, filed on Nov. 22, 2010 by Jean-Philippe Vasseur, 30 pages.
Winter, et al., "RPL: IPv6 Routing Protocol for Low Power and Lossy Networks," Internet Engineering Task Force (IETF) Internet Draft, Mar. 13, 2011 version, <draft-ietf-roll-rpl-19>, 164 pages.
Vasseur, et al., "Routing Metrics used for Path Calculation in Low Power and Lossy Networks," Internet Engineering Task Force (IETF) Internet Draft, Mar. 1, 2011 version, <draft-ietf-roll-routing-metrics-19>, 31 pages.
Thubert, "RPL Objective Function 0," Internet Engineering Task Force (IETF) Internet Draft, Jul. 29, 2010 version, <draft-ietf-roll-of0-03>, 10 pages.

* cited by examiner

*Primary Examiner* — Khanh Dinh
(74) *Attorney, Agent, or Firm* — Cesari and McKenna, LLP

(57) ABSTRACT

In one embodiment, a distributed control technique may enable management of a monolithic routing topology of nodes in a computer network by apportioning the monolithic routing topology into a plurality of regional routing topology domains, each represented by a directed acyclic graph (DAG). The regional topology domains may include a super topology domain that is established as a super-DAG of intermediate nodes interconnected with leaf nodes and rooted by a master node of the computer network. The regional topology domains may further include at least one local topology domain that is established as a local-DAG of intermediate nodes interconnected with leaf nodes and rooted by a local root node of the computer network. Notably, a super node of the computer network may be configured to participate in both the super topology domain as an intermediate node of the super-DAG and the local topology domain as the local root node of the local-DAG.

20 Claims, 5 Drawing Sheets

DISTRIBUTED CONTROL TECHNIQUE FOR RPL TOPOLOGY

RELATED APPLICATION

The present application claims the benefit of Indian Application No. 936/DEL/2011, filed on Apr. 1, 2011, entitled DISTRIBUTED CONTROL TECHNIQUE FOR RPL TOPOLOGY, by N. Agarwal et al.

TECHNICAL FIELD

The present disclosure relates generally to computer networks, and, more particularly, to management and control of routing topologies represented by directed acyclic graphs (DAG), e.g., for Low power and Lossy Networks (LLNs).

BACKGROUND

Low power and Lossy Networks (LLNs), e.g., sensor networks, have a myriad of applications, such as Smart Grid and Smart Cities. Various challenges are presented with LLNs, such as lossy links, low bandwidth, battery operation, low memory and/or low processing capability of nodes. One example routing solution to LLN challenges is a protocol called Routing Protocol for LLNs or "RPL," which is a distance vector routing protocol. One or more instances of the RPL protocol can be used to build a routing topology that is deployed over the LLN using a set of metrics and constraints. Each RPL routing topology built by an RPL instance may be represented by a Directed Acyclic Graph (DAG) that is rooted by a root node. Other nodes of the LLN may participate in the routing topology by discovering and attaching to the DAG based on configuration and policies.

The root node is a central authority that defines and controls the behavior of all nodes participating in the RPL topology. The root node also manages several key RPL attributes, such as timer settings and global repair, which impact the topology. While a single point of control model centralized at the root node may be desirable in terms of fine-tuning and managing the RPL topology, such a model may become problematic when the RPL topology is a monolithic routing topology, which may occur in certain LLN application deployments.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
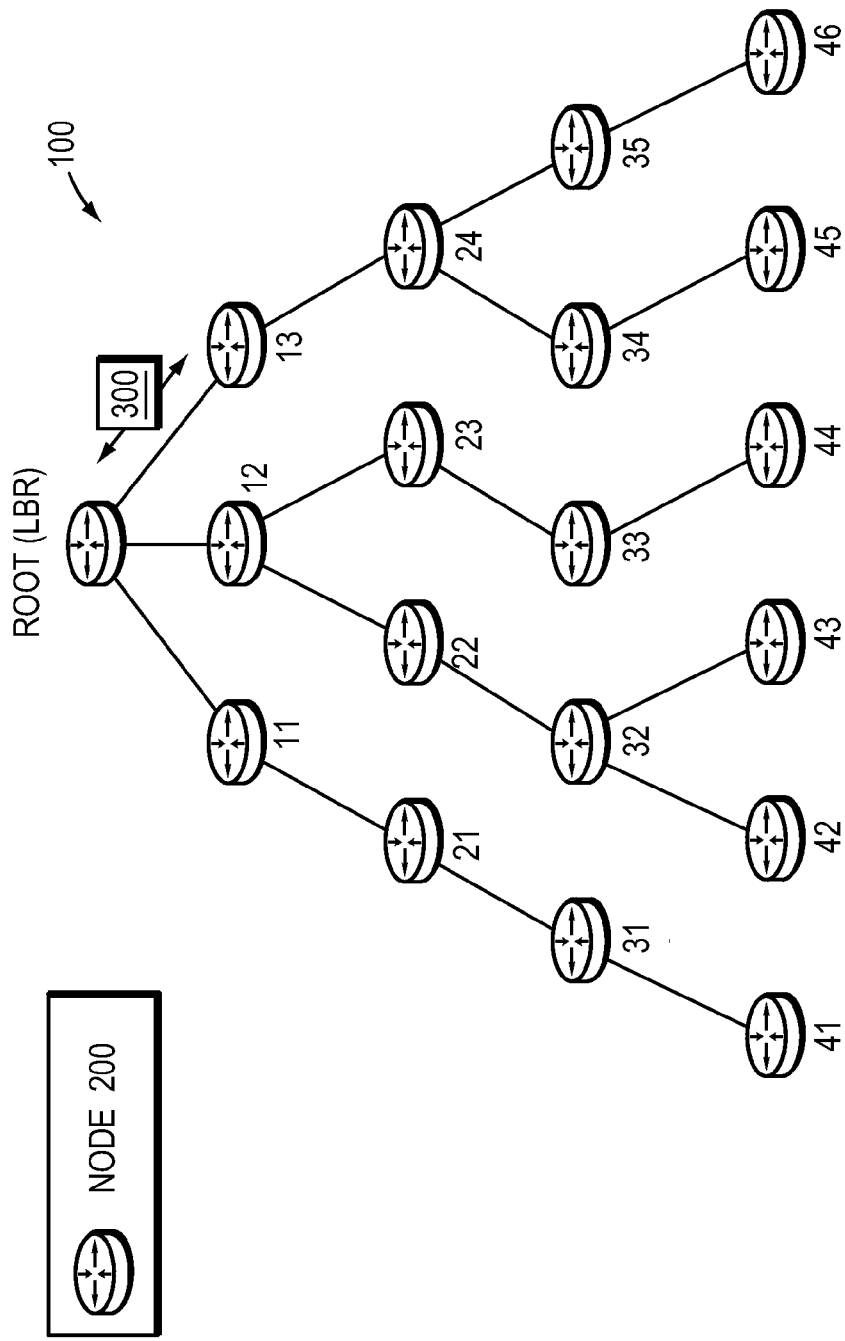
FIG. 1 illustrates an example monolithic routing topology deployed over a computer network and represented by a directed acyclic graph (DAG)

According to one or more embodiments of the disclosure, a distributed control technique may enable management of a monolithic routing topology of nodes in a computer network by apportioning the monolithic routing topology into a plurality of regional routing topology domains, each represented by a directed acyclic graph (DAG). The regional topology domains may include a super topology domain that is established as a super-DAG of intermediate nodes interconnected with leaf nodes and rooted by a master node of the computer network. The regional topology domains may further include at least one local topology domain that is established as a local-DAG of intermediate nodes interconnected with leaf nodes and rooted by a local root node of the computer network. Notably, a super node of the computer network may be configured to participate in both the super topology domain as an intermediate node of the super-DAG and the local topology domain as the local root node of the local-DAG.

In an illustrative embodiment, the super node may be further configured to communicate with the master node to create a topology-connecting fabric between the super node and master node that interconnects the local topology domain with the super topology domain. Communication between the super node and master node may be effected through the exchange of unicast control messages to establish a hierarchy of routing topology domains. The topology-connecting fabric may be utilized to facilitate global management of the hierarchy of domains by enabling the master node to directly control the super-DAG topology domain, while distributing control of the local-DAG topology domains to the super nodes. In essence, the distributed control technique allows the master node to function as a central authority to globally manage the entire monolithic routing topology, including the hierarchy of super and local routing topology domains.

Description

A computer network is a geographically distributed collection of nodes interconnected by communication links and segments for transporting data between end nodes, such as personal computers and workstations, or other devices, such as sensors. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2 and others. In addition, a Mobile Ad-Hoc Network (MANET) is a type of wireless ad-hoc network that is generally considered a self-configuring network of mobile routes (and associated hosts) connected by wireless links, the union of which forms an arbitrary topology.

Smart object networks, such as sensor networks in particular, are a specific type of network consisting of spatially distributed autonomous devices such as sensors that cooperatively monitor physical or environmental conditions at different locations, such as, e.g., temperature, pressure, vibration, sound, radiation, motion and/or pollutants. Other types of smart objects include actuators, e.g., objects responsible for turning on/off an engine or performing other actions. Sensor networks are typically wireless networks, though wired connections are also available. That is, in addition to one or more sensors, each sensor device (node) in a sensor network may generally be equipped with a radio transceiver or other communication port, a microcontroller, and an energy source, such as a battery. Generally, size and cost constraints on sensor nodes result in corresponding constraints on resources such as energy, memory, computational speed and bandwidth. Correspondingly, a reactive routing protocol may, though need not, be used in place of a proactive routing protocol for sensor networks.

Sensor networks generally do not have a predefined routing topology imposed by, for example, point-to-point wires, so links and sensors are typically discovered, selected and configured sparingly. In certain configurations, the sensors in a sensor network transmit their data to one or more centralized or distributed database management nodes that obtain the data for use with one or more associated applications. Alternatively (or in addition), certain sensor networks provide for mechanisms by which an interested subscriber (e.g., "sink") may specifically request data from nodes in the network. In a "push mode," the sensors transmit their data to the sensor sink/subscriber without prompting, e.g., at a regular interval/frequency or in response to external triggers. Conversely, in a "pull mode," the sensor sink may specifically request that the sensors (e.g., specific sensors or all sensors) transmit their current data (or take a measurement and transmit that result) to the sensor sink. (Those skilled in the art will appreciate the benefits and shortcomings of each mode, and both apply to the techniques described herein.)

FIG. 1 illustrates an example monolithic routing topology deployed over a computer network 100 comprising nodes/devices 200, such as, e.g., routers, sensors and/or computers, interconnected by various methods of communication, such as links, and labeled as shown (e.g., "LBR," "11," "12," . . . "46"). The links of the computer network may be wired links or may comprise a wireless communication medium, where certain nodes 200 of the network may be in communication with other nodes 200, e.g., based on distance, signal strength, current operational status and/or location. Those skilled in the art will understand that any number of nodes, devices, and/or links may be used in the computer network, and that the view shown herein is for simplicity. Illustratively, certain nodes in the network may be more capable than others, such as those nodes having, e.g., larger memories and/or sustainable non-battery power supplies, versus those nodes having minimal memory and/or battery power. For instance certain nodes 200 may have no or limited memory capability. Also, one or more of the nodes 200 may be considered root nodes/devices (or root capable nodes) while one or more of the nodes may also be considered destination nodes/devices.

Data packets or messages 300 (e.g., traffic sent between the devices/nodes) may be exchanged among the nodes/devices of the computer network 100 using predefined network communication protocols such as, among others, the Transmission Control Protocol/Internet Protocol (TCP/IP), User Datagram Protocol (UDP), Multi-Protocol Label Switching (MPLS) and/or various proprietary protocols. In this context, a protocol consists of a set of rules defining how the nodes interact with each other. In addition, messages within the network 100 may be transmitted in a different manner depending upon node capabilities, such as source routed messages.

Figure 2:
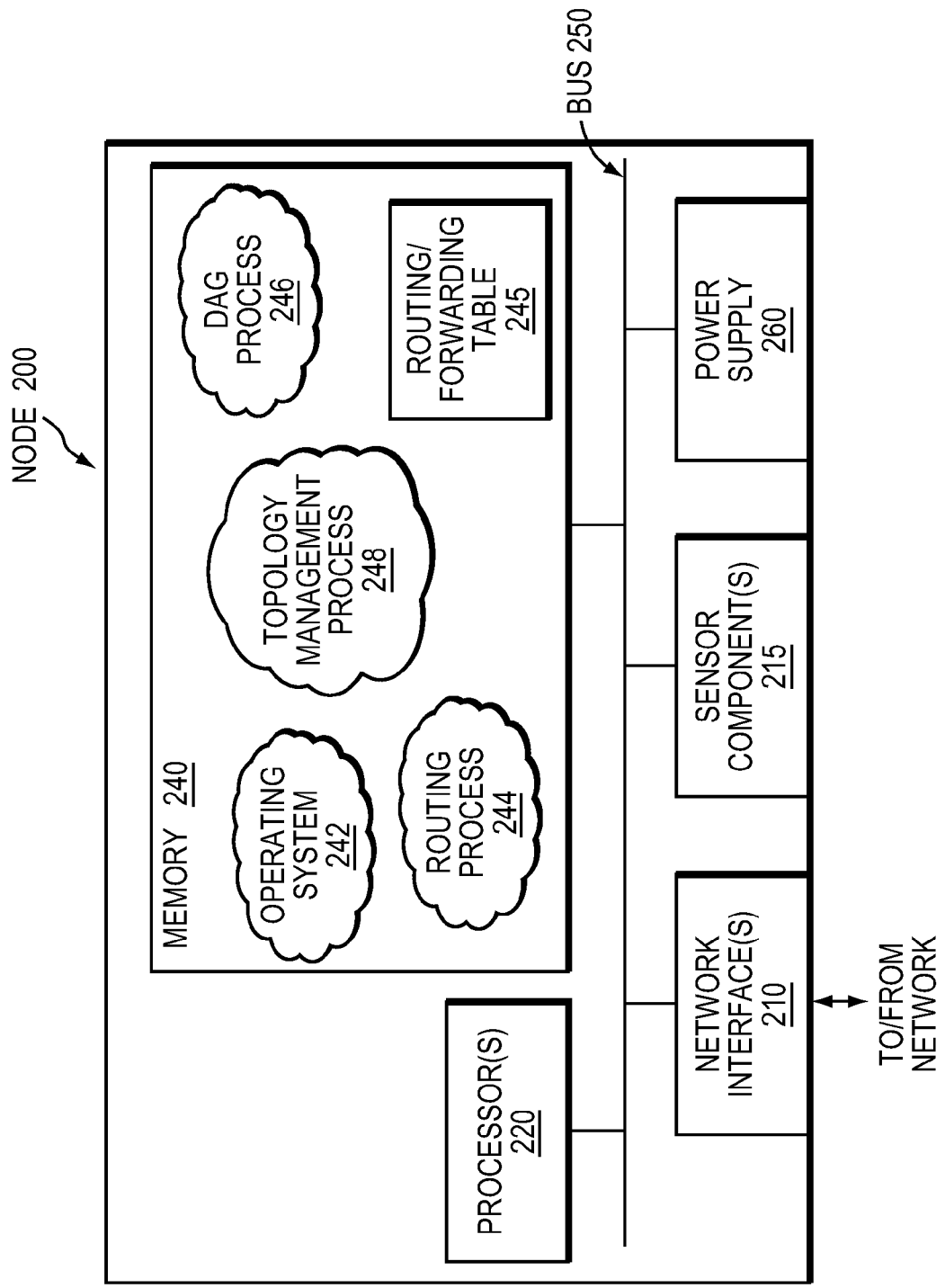
FIG. 2 illustrates an example network node/device.

FIG. 2 illustrates an example node/device 200 that may be used with one or more embodiments described herein, e.g., as a root node, intermediate node or sensor. The node may comprise one or more network interfaces 210, one or more sensor components 215 (e.g., sensors, actuators), a power supply 260 (e.g., battery, plug-in), one or more processors 220 (e.g., 8-64 bit microcontrollers), and a memory 240 interconnected by a system bus 250. The network interface(s) 210 contain the mechanical, electrical, and signaling circuitry for communicating data over physical and/or wireless links coupled to the network 100. The network interface(s) may be configured to transmit and/or receive data using a variety of different communication protocols, including, inter alia, TCP/IP, UDP, wireless protocols (e.g., IEEE Std. 802.15.4, WiFi, Bluetooth®,), Ethernet and/or PLC protocols.

The memory 240 comprises a plurality of storage locations that are addressable by the processor(s) 220 and the network interface(s) 210 for storing software programs and data structures associated with the embodiments described herein. As noted above, certain nodes may have limited memory or no memory (e.g., no memory for storage other than for programs/processes operating on the node). The processor(s) 220 may comprise necessary elements or logic adapted to execute the software programs and manipulate the data structures, such as routes or prefixes of a routing/forwarding table 245 (notably on capable nodes only). An operating system 242, portions of which are typically resident in memory 240 and executed by the processor(s), functionally organizes the node by, inter alia, invoking operations in support of software processes and/or services executing on the node. These software processes and/or services may comprise routing process (services) 244, which may include an illustrative directed acyclic graph (DAG) process 246. Also, for root nodes (or other management nodes), a topology management process 248 may be used as described herein. It will be apparent to those skilled in the art that other processor and memory types, including various computer-readable media, may be used to store and execute program instructions pertaining to the technique described herein. Also, while the description illustrates various processes, it is expressly contemplated that the various processes may be embodied as modules configured to operate in accordance with the technique herein (e.g., according to the functionality of a similar process).

Routing process/services 244 contains computer executable instructions executed by the processor(s) 220 to perform functions provided by one or more routing protocols, such as proactive or reactive routing protocols as will be understood by those skilled in the art. These functions may, on capable nodes, be configured to manage routing/forwarding table 245 containing, e.g., information used to make routing/forwarding decisions. In particular, in proactive routing, connectivity is discovered and known prior to computing routes to any destination in the network, e.g., link state routing such as Open Shortest Path First (OSPF), Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR) and DYnamic MANET On-demand Routing (DYMO). Notably, on nodes not capable or configured to store routing entries, routing process 244 may consist solely of providing mechanisms necessary for source routing techniques. That is, for source routing, other nodes in the network can direct the less capable nodes exactly where to send the messages, and the less capable nodes simply forward the messages as directed.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to low rate data traffic;

3) A number of use cases require specifying a set of link and node metrics, some being dynamic, thus requiring specific smoothing functions to avoid routing instability, considerably draining bandwidth and energy;

4) Constraint-routing may be required by some applications, e.g., to establish routing paths that avoid non-encrypted links and/or nodes running low on energy;

5) Scale of the networks may become very large, e.g., on the order of several thousands to millions of nodes; and 6) Nodes may be constrained with a low memory, a reduced processing capability and/or a low power supply (e.g., battery).

In other words, LLNs are a class of network in which nodes (e.g., routers) and their interconnects are constrained; LLN routers typically operate with constraints, e.g., processing power, memory, and/or energy (battery), and their interconnects are characterized by, illustratively, high loss rates, low data rates, and/or instability. The LLN may be sized with nodes ranging from a few dozen to as many as thousands or even millions of LLN routers, and may support point-to-point traffic (between nodes inside the LLN), point-to-multipoint traffic (from a central control point to a subset of nodes inside the LLN) and multipoint-to-point traffic (from nodes inside the LLN towards a central control point).

An example protocol specified in an Internet Engineering Task Force (IETF) Internet Draft, entitled "RPL: IPv6 Routing Protocol for Low Power and Lossy Networks" <draft-ietf-roll-rpl-19> by Winter, at al. (Mar. 13, 2011 version), provides a mechanism that supports multipoint-to-point (MP2P) traffic from nodes inside the LLN towards a central control point (e.g., LLN Border Routers (LBRs) or "root nodes/devices" generally), as well as point-to-multipoint (P2MP) traffic from the central control point to the nodes inside the LLN (and also point-to-point, or P2P traffic). RPL (pronounced "ripple") may generally be described as a distance vector routing protocol, e.g., executing as routing process 244 on nodes/devices in the LLN. One or more instances of the RPL protocol can be used to build a routing topology that is deployed over the LLN using a set of metrics and constraints. Each RPL routing topology built by an RPL instance may be represented by a Directed Acyclic Graph (DAG) for use in routing traffic/messages 300, in addition to defining a set of features to, e.g., bound the control traffic and/or support repair. Other nodes of the LLN may participate in the routing topology by discovering and attaching to the DAG based on configuration and policies.

Broadly stated, a DAG is a directed graph having the property that all edges are oriented in such a way that no cycles (loops) are supposed to exist. All edges are contained in paths oriented toward and terminating at one or more root nodes (e.g., "clusterheads or "sinks"), often to interconnect the nodes of the DAG with a larger infrastructure, such as the Internet, a wide area network, or other domain. In addition, a Destination Oriented DAG or DODAG (hereinafter generally denoted as "DAG") is a DAG anchored or rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher the rank of that node). Further, a tree is a kind of DAG, where each device/node in the DAG generally has one parent or, as used herein, one preferred parent.

DAGs may generally be built based on an objective function (OF), the role of which is generally to specify rules on how to build the DAG (e.g., number of parents and/or backup parents). In addition, one or more metrics/constraints may be advertised by the routing protocol to optimize the DAG. The routing protocol may further include an optional set of constraints to compute a constrained path, such as when a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the nodes within the DAG be able to reach the goal. In the case where a node is unable to comply with an OF or does not understand or support the advertised metric, it may be configured to join a DAG as a leaf node. As used herein, the various metrics, constraints and/or policies are considered DAG parameters.

Illustratively, example metrics used to select paths (e.g., preferred or "best" parents) may comprise cost, delay, latency, bandwidth and estimated transmission count (ETX), while example constraints that may be placed on the route selection may comprise various reliability thresholds, restrictions on battery operation, multipath diversity, load balancing requirements, bandwidth requirements, transmission types (e.g., wired, wireless), and also a number of selected parents (e.g., single parent trees or multi-parent DAGs). Notably, an example of how routing metrics may be obtained may be found in an IETF Internet Draft, entitled "Routing Metrics used for Path Calculation in Low Power and Lossy Networks" <draft-ietf-roll-routing-metrics-19> by Vasseur, et al. (Mar. 1, 2011 version). Further, an example OF (e.g., a default OF) may be found in an IETF Internet Draft, entitled "RPL Objective Function 0" <draft-ietf-roll-of0-03> by Thubert (Jul. 29, 2010 version).

Building of a DAG may utilize a discovery mechanism to build a logical representation of the network, and route dissemination to establish state within the network so that routers know how to forward messages toward their ultimate destinations. Note that a "router" refers to a node that can forward as well as generate traffic, while a "host" refers to a node that can generate but does not forward traffic. Also, a "leaf" node may be used to generally describe a non-router that is connected to a DAG by one or more routers, but cannot itself forward traffic received on the DAG to another router on the DAG. RPL control messages may be transmitted among the nodes within the network for discovery and route dissemination when building a DAG.

According to the illustrative RPL protocol, a DAG Information Object (DIO) is a type of RPL control message (i.e., a DAG discovery request message) that carries information that allows a node to discover an RPL instance, learn its configuration parameters, select a DAG parent set (in accordance with a parent selection process), and maintain the upward routing topology. A Destination Advertisement Object (DAO) is another type of RPL control message (i.e., a DAG discovery reply message) that conveys destination information upwards along the DAG so that a DAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG root nodes, e.g., following the orientation of the edges within the DAG. Conversely, "downward" or "down" paths are routes that lead in the direction from DAG root nodes towards leaf nodes, e.g., generally going against the orientation of the edges within the DAG.

Generally, a DAG discovery request (e.g., DIO) message is transmitted from the root node(s) of the DAG downward toward the leaves, informing each successive receiving node how to reach the root node (that is, from where the request is received is generally the direction of the root). Accordingly, a DAG is created in the upward (up) direction toward the root node. The DAG discovery reply (e.g., DAO) message may then be returned from the leaves to the root node(s) (unless unnecessary, such as for upward flows only), informing each successive receiving node in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DAG root which can, in turn, build the topology and locally compute downward routes to all nodes in the DAG. Such nodes are then reachable using source routing techniques over regions of the DAG that are incapable of storing downward routing state.

Figure 3:
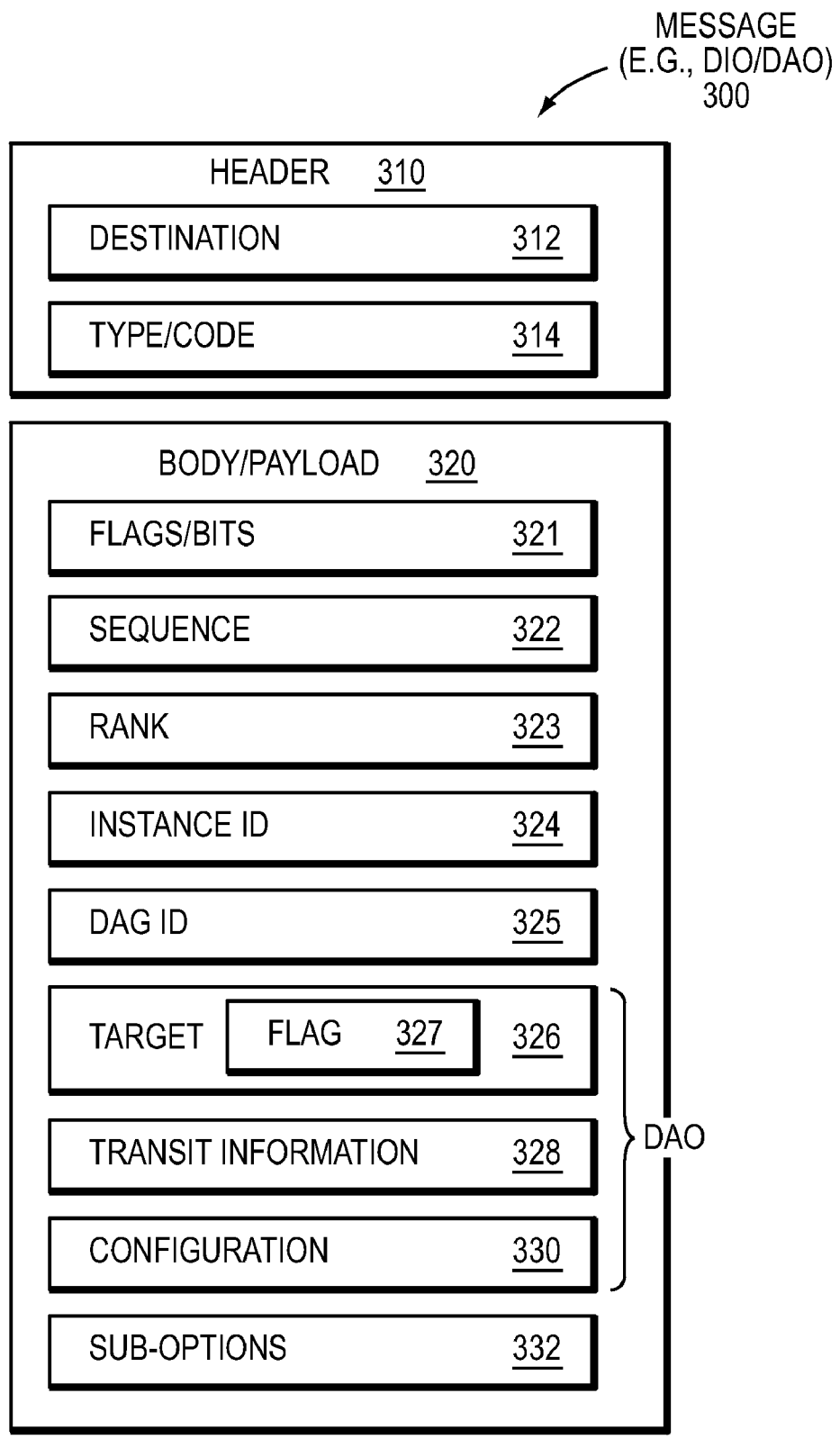
FIG. 3 illustrates an example message.

FIG. 3 illustrates an example message 300 with a simplified control message format that may be used for discovery and route dissemination when building a DAG, e.g., as a DIO or DAO message. Message 300 illustratively comprises a header 310 having a field 312 that holds a destination address of the recipient(s) of the message and one or more fields 314 that identify the type of message (e.g., a RPL control message), as well as a specific code indicating the specific type of message, e.g., a DIO or a DAO (or a DAG Information Solicitation). A body/payload 320 of the message may comprise a plurality of fields used to relay pertinent information. In particular, the fields may comprise various flags/bits 321, a sequence number 322, a rank value 323, a RPL instance ID 324, a DAG ID 325, and other fields, each as may be appreciated in more detail by those skilled in the art. Further, for DAO messages, a target field 326 may be used to record one or more destination prefixes, an optional transit information field 328 may be used to record one or more parents and a configuration field 330 may be used to record one or more parameters. For either DIOs or DAOs, one or more additional sub-option fields 332 may be used to supply additional or custom information within the message 300. For instance, an objective code point (OCP) sub-option field may be used within a DIO to carry codes specifying a particular objective function to be used for building the associated DAG.

As noted above, the root node (e.g., a LBR) of a DAG is a central authority that defines and controls, for the most part, the behavior of all nodes participating in the RPL topology. The root node also manages several key RPL attributes, such as timer settings, global repair, routing metrics and constraints, which impact the topology. While a single point of control model centralized at the root node may be desirable in terms of fine-tuning and managing the RPL topology, such a model may become problematic when the RPL topology is a monolithic routing topology, which may occur in certain LLN applications having a large deployment of nodes, such as sensors. Here, changes may occur over a period of time in certain areas of the RPL topology because, e.g., the communication links (paths) between sensors are or become noisy or lossy. For example, a path from a sensor to its original parent may become suboptimal as compared to other neighbors that are available or become unavailable during the time period. As a result, the sensor may decide to change its original parent and select an alternate parent, thus initiating (triggering) a process called "local repair." Local repair is a local optimization performed at a sensor (node) in response to changes in its local environment.

Over this same period of time, many local repairs may be performed that impact a set of nodes within the monolithic RPL topology, thus rendering the topology sub-optimal. The RPL protocol allows reoptimization of the DAG representing the topology by triggering a process called "global repair." Global repair is based on the centralized control model that is triggered by the LBR root incrementing a sequence number (e.g., in field 322 of message 300) for the DAG. The incremented sequence number instructs each node in the DAG to run the objective function which, e.g., specifies the criteria for selecting an optimal parent in accordance with the parent selection process. In a monolithic topology having a large deployment of nodes/sensors, it is possible that when the LBR root triggers global repair, many nodes may run their objective functions and realize that they are already optimized, while only a few nodes may realize that they need to select new parents. Global management (including global repair) in such a monolithic topology may thus be inefficient, as well as energy, bandwidth and time consuming with respect to many of the nodes, thereby negatively impacting scalability.

Therefore, it may be desirable to divide or apportion the monolithic RPL routing topology into a plurality of regional routing topologies (potentially with different parameter settings), similar to autonomous systems, for management purposes. However, unlike autonomous systems, it may be further desirable to allow the LBR root of the DAG topology to maintain its function of a central authority to enable global management over the entire topology.

Distributed Control Technique

According to one or more embodiments of the disclosure, a distributed control technique may enable management of a monolithic routing topology of nodes in a computer network by apportioning the monolithic routing topology into a plurality of regional routing topology domains, each represented by a directed acyclic graph (DAG). The regional topology domains may include a super topology domain that is established as a super-DAG of intermediate nodes interconnected with leaf nodes and rooted by a master node of the computer network. The regional topology domains may further include at least one local topology domain that is established as a local-DAG of intermediate nodes interconnected with leaf nodes and rooted by a local root node of the computer network. Notably, a super node of the computer network may be configured to participate in both the super topology domain as an intermediate node of the super-DAG and the local topology domain as the local root node of the local-DAG.

In an illustrative embodiment, the super node may be further configured to communicate with the master node to create a topology-connecting fabric between the super node and master node that interconnects the local topology domain with the super topology domain. Communication between the super node and master node may be effected through the exchange of unicast control messages to establish a hierarchy of routing topology domains. The topology-connecting fabric may be utilized to facilitate global management of the hierarchy of domains by enabling the master node to directly control the super-DAG topology domain, while distributing control of the local-DAG topology domains to the super nodes. In essence, the distributed control technique allows the master node to function as a central authority to globally manage the entire monolithic routing topology, including the hierarchy of super and local routing topology domains.

Figure 4:
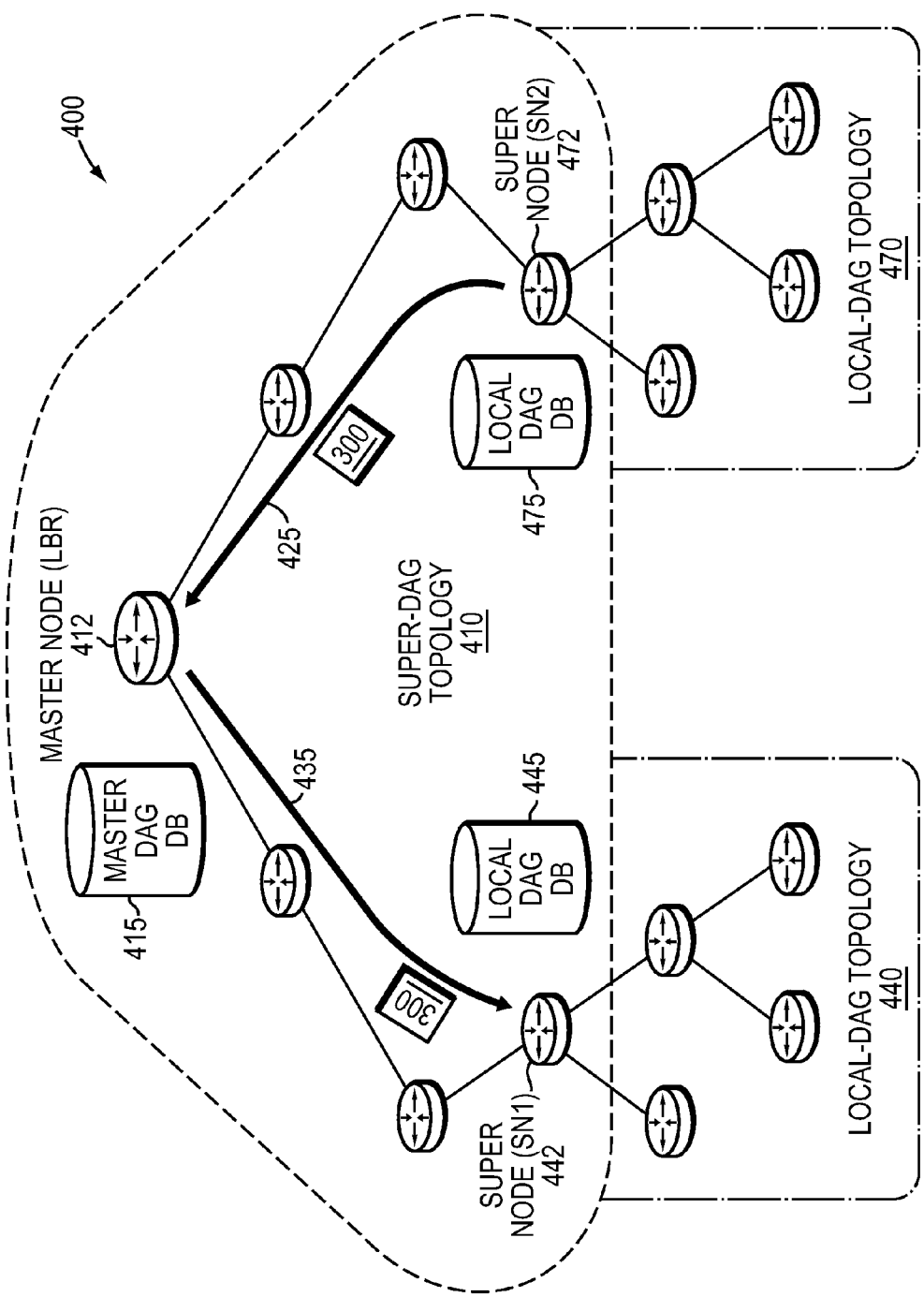
FIG. 4 illustrates an example monolithic DAG routing topology apportioned into a hierarchy of regional DAG routing topology domains.

FIG. 4 illustrates an example monolithic routing topology of nodes apportioned into a hierarchy 400 of regional routing topology domains, each represented by a DAG. In an illustrative embodiment, the hierarchy 400 of regional DAG routing topology domains (hereinafter "DAG topologies") may include, e.g., a super-DAG topology 410 interconnected with one or more local DAG topologies 440, 470. A LBR root is the central controlling authority of the entire hierarchy 400 of DAG topologies and, as such, may be configured as a master node 412 to manage both the super-DAG topology 410 as well as the local DAG topologies 440, 470.

According to one or more embodiments described herein, super nodes (SN1, SN2) may be configured to participate in the super-DAG topology 410 as intermediate nodes. In addition, the super nodes SN1 and SN2 may be configured to participate in their respective local-DAG topologies 440, 470 as local root nodes 442, 472. Participation in multiple DAG topologies may be enabled by, e.g., configuring each super node as a "dual role" node in accordance with the novel technique described herein. To that end, each super node SN1 and SN2 may be illustratively configured to implement the technique using appropriate hardware, software, and/or firmware in accordance with topology management process 248, which may contain computer executable instructions executed by the processor(s) 220 to perform functions relating to the novel technique, e.g., in conjunction with routing process 244 and DAG process 246. For instance, each super node may be configured with substantial processing (e.g., CPU) capabilities and storage (e.g., memory and/or disk) resources for performing the distributed control technique functions described herein. Illustratively, the super node may be embodied as a router or controller rather than a typical sensor (e.g., a leaf node) that terminates a DAG. Configuration of the super node may occur either statically during manufacture or dynamically by a system administrator, e.g., by logging into the node via a user interface.

Operationally, each super node SN1, SN2 may discover the super-DAG via RPL control messages 300 and join the super-DAG as an intermediate node to establish the super-DAG topology 410 of interconnected intermediate nodes and leaf nodes rooted by the master node 412, based on configuration and policies. For example, the super node may join the super-DAG using the normal rules of parent selection as defined by an objective function. Each super node SN1, SN2 also roots its respective local-DAG topology 440, 470 as a local root node 442, 472. Intermediate and leaf nodes in the vicinity of the super node may discover the local-DAG via RPL control messages 300 and join the local-DAG to establish the local-DAG topology 440, 470, e.g., based on configuration and policies. Events in the local-DAG topology may further be localized and consolidated at the super node.

As described herein, each super node SN1, SN2 may cooperate with the master node 412 to effectively interconnect the super-DAG and local-DAG topologies and establish the routing domain hierarchy. Notably, the hierarchy of the super-DAG topology 410 coupled to local-DAG topologies 440, 470 comprises an entire routing topology infrastructure, wherein the master node 412 may be deployed at the root of the super-DAG topology 410 and cooperate with the super nodes SN1, SN2, which may be deployed at the border between the super-DAG topology and the local DAG topologies 440, 470. Thereafter, the master node may manage the entire hierarchy infrastructure in accordance with the distributed control technique. To that end, the master node 412 may be illustratively configured to perform the functions of the novel technique using appropriate hardware, software, and/or firmware in accordance with topology management process 248, e.g., in conjunction with routing process 244 and DAG process 246.

According to one or more embodiments described herein, the master node 412 may illustratively manage the DAG topologies through the exchange of unicast control messages (in both downward and upward directions) with the super nodes, thus establishing a routing overlay. Note that, from a routing standpoint, such unicast control messaging provides a direct routing adjacency between the master node and the super nodes, as will be understood by those skilled in the art. The routing overlay may, in turn, be used to create a topology-connecting fabric between the super-DAG topology 410 and the local-DAG topologies 440, 470. Thereafter, the topology-connecting fabric may be used to, e.g., establish the hierarchy of DAG topologies and allow global management of the hierarchy by the master node, as described herein.

For example, the exchange of unicast control messages may be employed to communicate, among other things, address and configuration information. In an illustrative embodiment, each super node SN1, SN2 has a globally routable IPv6 address and, upon joining the super-DAG, may communicate this address to the master node (via any intermediate nodes) by, e.g., inserting that address in the target field 326 of a unicast DAO message 300. To ensure that any intermediate nodes do not process the content of field 326, a flag bit 327 (FIG. 3) may be employed to tag the address as a special address. Note that the DAO message 300 may contain multiple target fields 326, each having an associated flag bit 327. One of the fields 326 may be configured to hold the address of the super node and the flag bit 327 may be used to tag that address as a special address. Since the content of the target field 326 is relevant only to the master node, the flag bit 327 provides an indication to the other intermediate nodes to ignore the field and relay its content onward in the unicast DAO message to the master node, as illustratively depicted by topology-connecting fabric 425.

Upon reception of the message 300, the master node may process the content of field 326 to build a master DAG database 415. In an illustrative embodiment, the master DAG database 415 may further contain configuration information, including parameters, pertaining to the super nodes and their respective local-DAG topologies 440, 470. The configuration information and parameters may be provided to the super nodes SN1, SN2 and recorded in the local-DAG databases 445, 475 (e.g., using the topology-connecting fabric 435 described herein), thus avoiding enablement of any extra configuration on the super nodes. Alternatively, the configuration information and parameters may be preconfigured on the local-DAG databases or loaded via a system administrator and distributed by the master node. Examples of the configuration information and parameters may include the RPL instance identifier that identifies the current RPL instance executing on the nodes of the local-DAG topologies and the type of objective function (OF) executed by those nodes, as well as the DAG ID of the local-DAG topologies. Note that the type of OF (as well as routing metrics, constraints and/or timer values) executing on a local-DAG topology may be different from that executing on another local-DAG topology or even on the super-DAG topology; there is no restriction on whether the OFs and other routing parameters are the same or different.

The super nodes SN1, SN2 may utilize the configuration information, including the parameters and potential monitoring statistics, stored in the local-DAG databases 445, 475 to control the local-DAG topologies 440, 470. All nodes in the local-DAG topologies may report prefix information (e.g., in the target field 326) to their local root nodes 442, 472 (i.e., the super nodes SN1, SN2.) Although the prefix information may be stored at the local DAG databases 445, 475, the super nodes may make that information available to the nodes of the super-DAG topology 410 via the transmission of unicast DAO messages 300 to the master node 412 (i.e., via the topology-connecting fabric 425.) This has the added advantage that all intermediate nodes in the super-DAG topology 410 do not have to store prefix information of the local-DAG topologies 440, 470. In this case, traffic destined to nodes within the local-DAG topologies may be encapsulated from the master node to the local root node or, optionally, label switched. However, the topology-connecting fabric may be used to provide a complete view of the prefix information to the master node 412.

Subsequently, a super node SN1, SN2 may change the parameters in its local DAG database 445, 475 and report those changes (as well as, e.g., the monitoring statistics) to the master node using, e.g., the configuration field 330 of the unicast DAO message 300. It should be noted that the use of configuration field 330 in the DAO message format obviates the need to provide a new RPL control message, thereby reducing the overhead of the RPL protocol by limiting the exchange of extraneous control messages in the network. In response to the reported changes, the master node 412 may update its master DAG database 415 and thereafter use the updated database to monitor and query the states of the local-DAG topologies 440, 470.

If necessary, the master node may trigger global repair in a local-DAG topology by, e.g., sending a unicast DIO message 300 to the super node functioning as the local root node 442, 472 of the topology. Note that a DIO message typically includes a multicast address directed to all nodes of the DAG. However, according to one or more embodiments described herein, the unicast DIO message may include the destination address of the super node, thus effectively directing the message from the master node to the super node. In an illustrative embodiment, the destination address of the super node may be loaded into field 312 of the DIO message header 310. The unicast DIO message 300 having the destination address of a super node may flow transparently from the master node 412 through the intermediate nodes to the super node SN1, SN2, as illustratively depicted by topology-connecting fabric 435.

Figure 5:
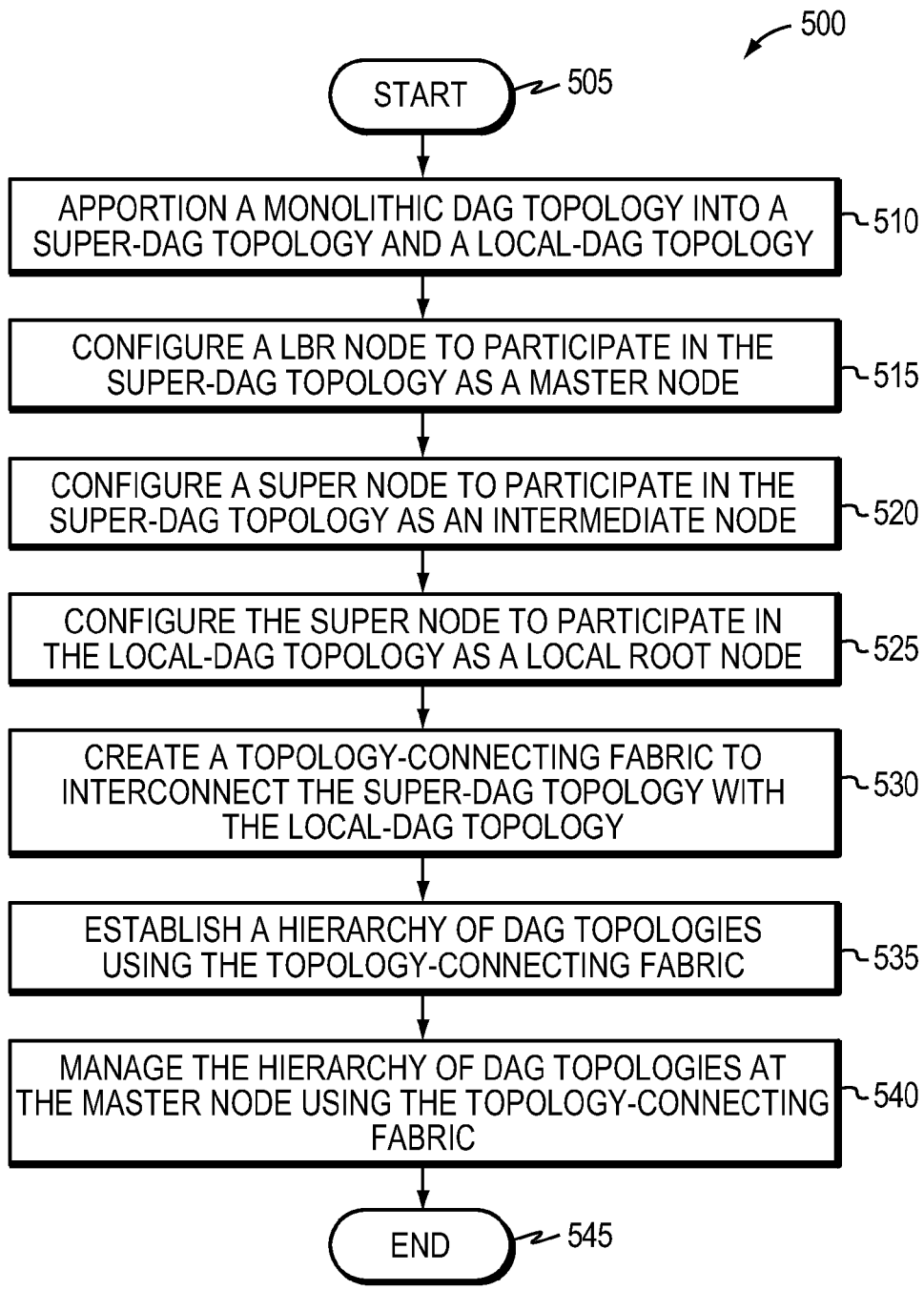
FIG. 5 illustrates an example simplified procedure for managing a monolithic DAG routing topology.

FIG. 5 illustrates an example simplified procedure for managing a monolithic DAG routing topology in accordance with one or more embodiments described herein. The procedure 500 starts at step 505 and continues to step 510 where the monolithic DAG topology may be apportioned into a plurality of regional DAG routing topology domains ("DAG topologies") including a super-DAG topology and at least one local-DAG topology. In step 515, a LBR node may be configured to participate in the super-DAG topology as a master node and, in step 520, a super node may be configured to participate in the super-DAG topology as an intermediate node. In step 525, the super node may also be configured to participate in the local-DAG topology as a local root node. In step 530, a topology-connecting fabric may be created, e.g., by further configuring the super node to communicate with the master root node, to interconnect the local-DAG topology with the super-DAG topology. In step 535, a hierarchy of DAG topologies may be established by, e.g., enabling communication between the super node and master node using the topology-connecting fabric. In step 540, the master node may globally manage the hierarchy of DAG topologies using the topology-connecting fabric. The procedure then ends at step 545.

In summary, the distributed control technique described herein facilitates global management of a monolithic routing topology including a hierarchy of DAG routing topologies. In particular, the distributed control technique allows a system administrator to configure the super node(s) and master node to, e.g., monitor, control and execute localized actions in response to local changes without impacting the rest of the routing topology. This allows for more flexibility and ease of maintaining the monolithic routing topology network.

Advantageously, the distributed control technique increases scalability of the monolithic routing topology as a result of the hierarchy of routing topologies. That is, the novel technique provides the master node with complete visibility as to the entire routing topology infrastructure to enable global management of the hierarchy of topologies, while distributing control to the super node(s) for local management of the regional topologies. The distributed control technique also preserves the RPL routing architecture through the introduction of extensions to existing RPL control messaging, e.g., the unicast control messages. Moreover, the control messaging extensions do not introduce additional processing overhead at intermediate nodes of the DAG topologies, e.g., the unicast DIO message may be transmitted as a typical RPL control message by the intermediate nodes that are not configured as super nodes. Hence, the distributed control technique does not require additional processing.

While there have been shown and described illustrative embodiments of a monolithic routing topology apportioned in a hierarchy of regional routing topology domains, it is to be understood that various other adaptations and modifications may be made within the spirit and scope of the embodiments herein. For example, the decision to apportion the monolithic routing topology into regional DAG topology domains may be triggered on-demand by the master node 412 according to a number of triggers, such as policy, amount of overhead observed by the master node and/or upon request by a super node to obtain local control with more aggressive timers.

In other words, there are a number of ways that a monolithic routing topology can be divided into regional topologies, such as through policy (configuration) or on-demand, whereby a certain node changes its normal behavior and becomes a super node. On-demand may be effected through intelligence and/or monitoring by the node of, e.g., the number of times local repair has occurred with the node. In this context, intelligence denotes the node observing certain counters or characteristics prior to transitioning to a super node on-demand. Note that configuration or policy may specify that the node has the capability of transforming itself into a super node SN1, SN2. For example, static configuration by a system administrator may originally designate the node as a super node or may initially designate the node as an intermediate node, but may enable transformation of the intermediate node to a super node in response to certain characteristics. When those characteristics are satisfied, the transformed node advertises itself as a super node to the master node and thereafter exhibits the same behavior as it would has it been manually configured as a super node.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on one or more tangible (non-transitory) computer-readable storage media (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
apportioning a monolithic routing topology of nodes in a computer network into a plurality of regional topology domains, each represented by a directed acyclic graph (DAG); establishing a super topology domain of the regional topology domains as a super-DAG of intermediate nodes interconnected with leaf nodes and rooted by a master node of the computer network;
establishing at least one local topology domain of the regional topology domains as a local-DAG of intermediate nodes interconnected with leaf nodes and rooted by a local root node of the computer network;
configuring a super node of the computer network to participate in both the super topology domain as an intermediate node of the super-DAG and the local topology domain as the local root node of the local-DAG;
creating a topology-connecting fabric between the super node and master node to interconnect the local topology domain with the super topology domain; and
utilizing the topology-connecting fabric to enable the master node to globally manage the monolithic routing topology including the plurality of regional topology domains.

2. The method as in claim 1, wherein utilizing the topology-connecting fabric comprises:
enabling the master node to directly control the super topology domain; and, distributing control of the local topology domain from the master node to the super node.

3. The method as in claim 1, wherein creating the topology-connecting fabric comprises:
establishing a hierarchy of topology domains.

4. The method as in claim 1, wherein creating the topology-connecting fabric comprises:
communicating between the super node and the master node through exchange of unicast control messages.

5. The method as in claim 4, wherein the unicast control messages includes a unicast Destination Advertisement Object (DAO) message.

6. The method as in claim 5, wherein communicating comprises: employing the unicast DAO message to communicate address information from the super node to the master node.

7. The method as in claim 6 wherein the super node has a globally routable address and wherein employing comprises: inserting the globally routable address in a target field of the unicast DAO message.

8. The method as in claim 7, wherein employing further comprises: providing an indication to the intermediate nodes to ignore the target field and relay the unicast DAO message to the master node.

9. The method as in claim 8, wherein the indication is a flag bit of the unicast DAO message.

10. The method as in claim 7, further comprising: processing the target field of the unicast DAO message to build a master DAG database at the master node.

11. The method as in claim 5, wherein communicating comprises: employing the unicast DAO message to communicate configuration information from the super node to the master node.

12. The method as in claim 11, wherein the configuration information includes parameters and monitoring statistics, and wherein employing comprises: changing the parameters in a local DAG database; and reporting the changed parameters to the master node using a configuration field of the unicast DAO message.

13. The method as in claim 12, further comprising: updating a master DAG database in response to the changed parameters; and monitoring a state of the local topology domain using the updated master DAG database.

14. The method as in claim 4, wherein the unicast control messages includes a unicast DAG Information Object (DIO) message.

15. The method as in claim 14, wherein communicating comprises: sending the unicast DIO message to the super node to trigger global repair in the local topology domain.

16. The method as in claim 15, wherein sending comprises: directing the unicast DIO message from the master node to the super node by loading a destination address of the super node into a destination field of the unicast DIO message.

17. An apparatus, comprising: one or more network interfaces connected to a computer network; a processor coupled to the network interfaces and adapted to execute one or more processes; and a memory configured to store a process executable by the processor, the process when executed operable to: apportion a monolithic routing topology of nodes in the computer network into a plurality of regional topology domains, each represented by a directed acyclic graph (DAG); establish a super topology domain of the regional topology domains as a super-DAG of intermediate nodes interconnected with leaf nodes and rooted by a master node of the computer network; establish at least one local topology domain of the regional topology domains as a local-DAG of intermediate nodes interconnected with leaf nodes and rooted by a local root node of the computer network; configure a super node of the computer network to participate in both the super topology domain as an intermediate node of the super-DAG and the local topology domain as the local root node of the local-DAG; create a topology-connecting fabric between the super node and master node to interconnect the local topology domain with the super topology domain; and utilize the topology-connecting fabric to enable the master node to globally manage the monolithic routing topology including the plurality of regional topology domains.

18. The apparatus as in claim 17, wherein the process when executed is further operable to: enable the master node to directly control the super topology domain; and, distribute control of the local topology domain from the master node to the super node.

19. The apparatus as in claim 17, wherein the process when executed is further operable to: establish a hierarchy of topology domains.

20. One or more non-transitory computer readable storage media encoded with software comprising computer executable instructions and when the software is executed operable to: apportion a monolithic routing topology of nodes in a computer network into a plurality of regional topology domains, each represented by a directed acyclic graph (DAG); establish a super topology domain of the regional topology domains as a super-DAG of intermediate nodes interconnected with leaf nodes and rooted by a master node of the computer network; establish a local topology domain of the regional topology domains as a local-DAG of intermediate nodes interconnected with leaf nodes and rooted by a local root node of the computer network; configure a super node of the computer network to participate in both the super topology domain as an intermediate node of the super-DAG and the local topology domain as the local root node of the local-DAG; create a topology-connecting fabric between the super node and master node to interconnect the local topology domain with the super topology domain; and utilize the topology-connecting fabric to enable the master node to globally manage the monolithic routing topology including the plurality of regional topology domains.

* * * * *